United States Patent Office 3,434,275
Patented Mar. 25, 1969

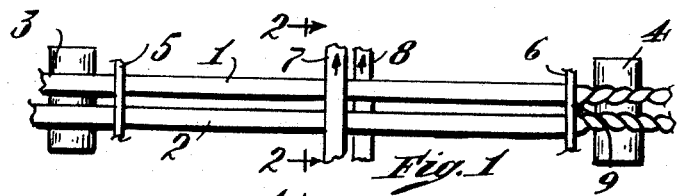
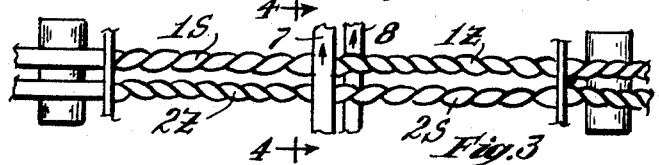
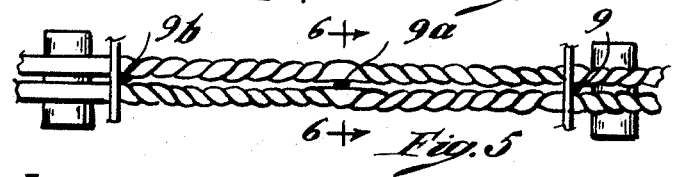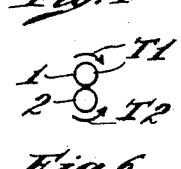
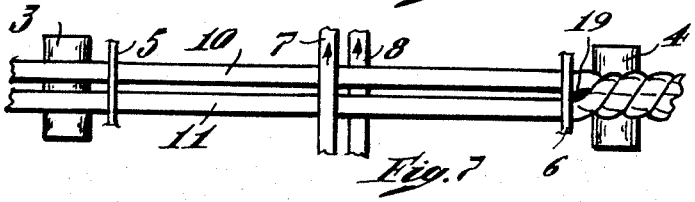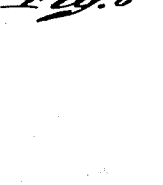
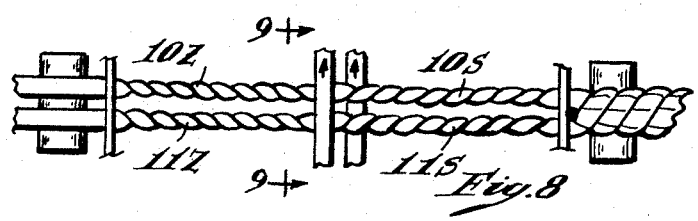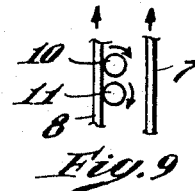
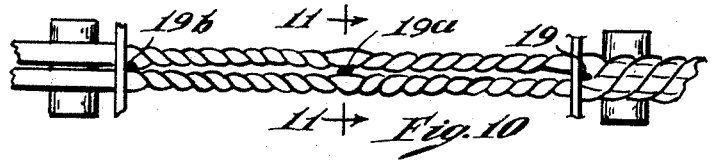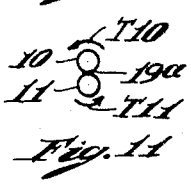
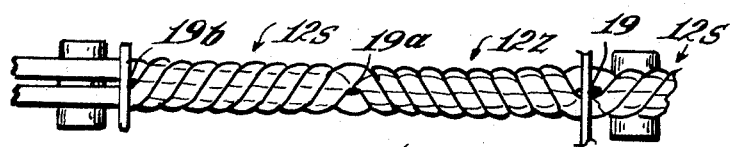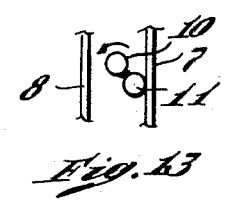
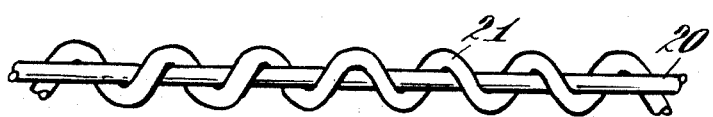

3,434,275
ALTERNATE TWIST YARNS AND METHOD OF FORMING SAME
Stanley Backer, 5 Irving Road, Waban, Mass. 02168, and Peter Popper, 3319 Morningside Road, Wilmington, Del. 19803
Filed Apr. 26, 1967, Ser. No. 633,760
Int. Cl. D02g 3/22, 3/36
U.S. Cl. 57—139                3 Claims

ABSTRACT OF THE DISCLOSURE

A combined yarn is formed from component strands by axially twisting one component in alternating directions in lengthwise intervals, and then attaching the component in the regions of twist reversal to another one or more components, which may be similarly twisted, oppositely twisted or untwisted. The combined yarn is torsionally balanced as a result of (1) twisting the components so that their unwinding torques exactly counterbalance, or (2) twisting the components so that their unwinding torques are unbalanced, thereby causing the combined yarn to rotate or ply until the ply torque exactly counterbalances the residual torque of the components.

BACKGROUND OF THE INVENTION

Field of the invention

This invention relates to twisted yarn structure and methods for producing twisted yarn.

Description of the prior art

Conventional twisting methods require a take-up package or spool which must be revolved as it accepts twisted yarns. Each yarn must have its own revolving take-up package. These requirements impose severe limitations both on the equipment making the twisted yarns and on the equipment using the twisted yarns. First, the take-up packages must be relatively small to conserve space and to conserve the power needed to revolve them. Second, the relatively small take-up packages must be removed frequently from the twisting equipment to periodically resupply the equipment using the twisted yarns.

SUMMARY OF THE INVENTION

According to the invention, the method of forming a combined yarn from a plurality of component strands comprises applying an axial twist to at least one component strand, said twist alternating in directions in lengthwise intervals and said twist causing said at least one component to rotate in said intervals relative to at least one other component strand, and joining said components in the regions of twist reversal. An axial, alternating twist may be applied to said at least one other component strand prior to joining with said at least one component strand. In one practical example, the components are twisted in the same rotational direction, for example clockwise, in the regions between joining, the two joined components having unbalanced torques which result in a spontaneous entwining of the components to form a counterbalancing torque. A combined yarn formed of a plurality of component strands comprises a first at least one component having an axial twist alternating in directions in lengthwise intervals, and a second at least one component joined to the first in the regions of twist reversal, the combined yarn having opposing torques in each interval to maintain said first component in twisted condition. In one practical example, the components are entwined around each other. In another practical example, one component substantially forms a core around which another component is wrapped or entwined. In a third practical example, the components are substantially straight and parallel.

DESCRIPTION OF THE DRAWINGS

FIGS. 1 to 6 illustrate one sequence of steps for producing a combined yarn according to the invention;
FIG. 1 is plan view illustrating one stage of manufacture;
FIG. 2 is a section on line 2—2 of FIG. 1;
FIG. 3 is a plan view illustrating another stage of manufacture;
FIG. 4 is a section on line 4—4 of FIG. 3;
FIG. 5 is a plan view illustrating a further stage of manufacture;
and
FIG. 6 is a section on line 6—6 of FIG. 5;
FIGS. 7 to 13 illustrate another sequence of steps for producing another combined yarn according to the invention;
FIG. 7 is a plan view illustrating one stage of manufacture;
FIG. 8 is a plan view illustrating another stage of manufacture;
FIG. 9 is a section on line 9—9 of FIG. 8;
FIG. 10 is a plan view illustrating another stage of manufacture;
FIG. 11 is a section on line 11—11 of FIG. 10;
FIG. 12 is a plan view illustrating another stage of manufacture;
FIG. 13 is a sectional view similar to FIG. 9 illustrating a modified step;
FIG. 14 illustrates another combined yarn produced according to the invention.

DESCRIPTION OF THE PREFERRED EMBODIMENTS

Figure 15:
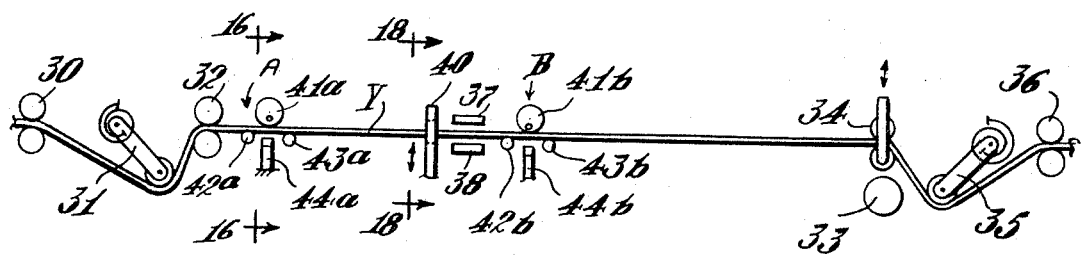
FIG. 15 is a schematic diagram of apparatus for producing combined yarn according to the invention.

FIGS. 1 to 6 illustrate one example of the invention adapted to cyclic practice. At the beginning of a cycle, component strands 1 and 2 are entrained over feed rolls 3 and 4 and gripped in spaced substantially parallel relationship by grippers 5 and 6. Disposed above and below the component strands 1 and 2, in the region between grippers 5 and 6, are twist belts 7 and 8 respectively (FIGS. 1 and 2). The twist belts move in the direction shown by the arrows. The component strands 1 and 2 are joined by bonding, fusing, or entanglement at point 9 from the previous cycle of operation.

In each cycle of operation, the sequence of steps is as follows: Strand 1 is brought into contact with twist belt 7 to apply a counterclockwise axial rotation to strand 1 in the region between grippers 5 and 6 (FIG. 4). Component strand 1 is thus divided into two lengthwise intervals alternating in twist direction, having a section 1S of S-twist and a section 1Z of Z-twist (FIG. 3). Similarly, component strand 2 is brought into contact with twist belt 8, to apply a clockwise axial rotation to the strand and to produce a section 2S of S-twist, and a section 2Z of Z-twist. As shown in FIG. 3, sections 1S and 2Z of opposite twist direction are adjacent, and sections 1Z and 2S of opposite twist direction are adjacent. After the component strands 1 and 2 have received the desired amount of twist from belts 7 and 8, they are joined together in the regions where the twist changes in direction, as at 9a and 9b (FIG. 5). Joining the components prevents them from untwisting.

Where the strand properties and the amount of twist have been such as to produce equal and opposite unwinding torques T1 and T2 for the components 1 and 2 (FIG. 6), the strands will stay in the parallel, side-by-side configuration shown in FIG. 5, each component producing a torque in any lengthwise interval exactly counterbalanced by the torque of the other.

To prepare for a new cycle, the combined component strands 1 and 2 are released by grippers 5 and 6 and advanced by feed rolls 3 or 4 until the initial position shown in FIG. 1 is reached, joining region 9b appearing in the position formerly occupied by joining region 9. A new cycle is then begun.

FIGS. 7 to 13 illustrate another example of the invention. At the beginning of a cycle, component strands 10 and 11 are entrained over rollers 3 and 4, gripped by grippers 5 and 6, and dispersed between twist belts 7 and 8 as before. Components 10 and 11 are joined at 19 from the previous cycle. In each cycle the sequence of operations is as follows: Components 10 and 11 are brought into contact with belt 8, each being given a clockwise axial rotation (FIG. 9). Lengthwise intervals 10Z and 10S having alternately directed twist are produced in component yarn 10, and similarly lengthwise intervals 11Z and 11S of alternately directed twist are produced in component yarn 11 (FIG. 8). Because the yarns are rotated in the same direction, adjacent the intervals 10Z and 11Z are twisted in the same direction, as are adjacent intervals 10S and 11S (FIG. 9). When the desired amount of twist has been applied to components 10 and 11, they are released from belt 8, gripped near the region of the belt, and joined in the regions of twist reversal, such as at 19a and 19b (FIG. 10). When held in the configuration shown in FIG. 10, the components 10 and 11 will have individual unwinding torques T10 and T11 which do not counterbalance one another but urge the combined components in the same rotational direction, here counterclockwise (FIG. 11). When components 10 and 11 are released their unbalanced combined torques will cause a spontaneous plying or entwining of one component about another. When the plying or entwining has proceeded enough to produce a torque exactly counterbalancing the remaining individual torques of the components, the combined yarn will be in its final, stable configuration shown in FIG. 12, with lengthwise intervals 12S and 12Z of alternately directed ply twist. This configuration changes, of course, as tension in the combined yarn is varied. Increases in tension will convert ply twist to component twist and decreases in tension will convert component twist to ply twist.

Although the entwining takes place spontaneously, without any outside influence, it may be hastened by bringing the combined yarn into contact with twist belt 7 to impart a counterclockwise twist to the combined yarn (FIG. 13). To return to the beginning of the cycle shown in FIG. 7, grips 5 and 6 are released, and the yarns are advanced by feed rolls 3 or 4 until joining region 19b is in the position formerly occupied by 19. A new cycle is then begun.

In each of the illustrated procedures alternate twist is applied to an individual component so as to effect, in the regions between joining, an axial rotation of the component relative to another of the components to which it is joined. For example, as shown in FIG. 4, the cross-section of component 1 is twisted so as to axially rotate it relative to the cross-section of component 2. This relative rotation causes an alternate twisted condition of one component to effectively resist untwisting of another component or components. When two components are twisted in opposite directions and fastened at the regions of twist reversal, the tendency of either component to untwist will be directly resisted by the tendency of the other component to untwist in the opposite direction, the balance of torques retaining both in alternate twisted condition. When twist is applied to one component and not to another, or is applied to two components in the same direction, or is applied to two components in different directions to different extents, the components in any case being joined at the regions of twist reversal, then when the joined components are released, a plying or entwining action will take place in which some but not all of the component twist is converted into a ply twist and a balance of torques will exist between the remaining twist of the components and the ply twist. The ply twist will, of course, also be an alternate twist. Applied tension tending to reduce the ply twist will tend to increase the alternate twist of the components, and untwisting of the combined yarn is thus resisted.

The combined yarn produced as described, although twisted throughout its length, has an average twist over several intervals of zero. It, therefore, may be wound on take-up packages whose speed of rotation is dictated only by the desired wind-up velocity and not by the number of turns of twist being inserted by the process in a unit of time. Hence, with the utilization of a large wind-up package, the rotational velocity of said package need not be excessive in the twisting method here described. Also the output from the described process may be fed directly to yarn utilizing machinery.

A number of different combined yarns may be produced by the basic method described above through changes in operational variables:

(1) Strands of different cross-sectional size or configuration may be used to produce the combined yarns.

(2) The tension on each strand during twisting and joining may be controlled. As shown in FIG. 14, if one strand 20 is held under greater tension than another strand 21 during twisting and joining, then the tensioned strand 20 will tend to form a core and the other strand will tend to wrap around the core.

(3) Components having different torsional rigidities, bending stiffnesses or tensile moduli may be used. For example, strands with different torsional rigidities will yield unequal torques with the same amount of twisting. For another example, a strand with a greater tensile recovery may be used to form a core yarn.

(4) The number of component strands forming the combined yarn may be varied. For example, a group of two strands may together be given the alternating twist heretofore described as being applied to a single component, and then this group may be joined with another group of one or more strands. For another example, two strands may be twisted as described above with reference to FIGS. 7 to 13, and then may be joined with a tensioned untwisted strand which will form a core about which the first two strands entwine. For another example, three components may be separately twisted in the same direction to form a three-ply entwined yarn.

(5) As shown by the examples of FIGS. 1 to 13, the twist may be inserted in adjacent strands in the same or opposite directions.

(6) The amount of twist may be varied to produce different torques. As described with reference to FIGS. 1 to 6, twist producing equal and opposite torques will yield a combined yarn with two side-by-side twisted components. As described above with reference to FIGS. 7 to 13, twists producing component torques which are unbalanced will yield a combined yarn with entwined components. Entwining will take place whenever the torques of the components are unbalanced, and thus strands twisted in opposite directions (as in FIGS. 1 to 6) but to different extents to produce unequal torques will also entwine.

(7) The length of intervals between joining points can be varied. Short and long sections may alternate, or sections may have random lengths, for desired textural effects. It may be desirable to produce a special length between joining points as, for example, in the making of a tufted carpet where the joining points are to be concealed at the reverse of the carpet.

(8) The material used to make the yarn may be varied. Staple or monofilament yarn, roving, film, foil, web, wire, and others may form one or more of the components.

Figure 18:
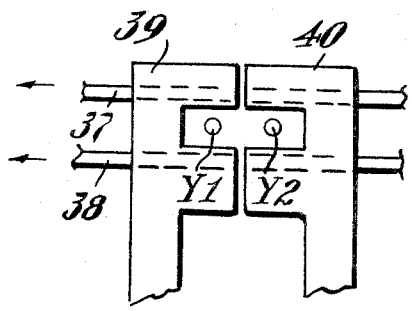
FIG. 18 is a section on line 18—18 of FIG. 15.
Figure 19:
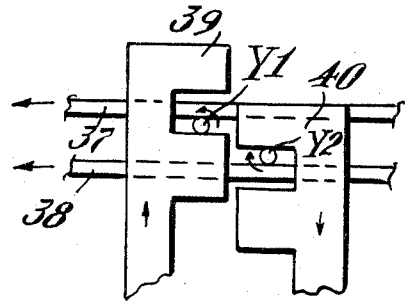
FIG. 19 is a view similar to FIG. 18 showing the apparatus of FIG. 18 in a different position.

FIG. 15 illustrates apparatus which can be used to carry out the invention as a continuous process with constant input and output speeds. Strand components Y1 and Y2 enter the apparatus at a uniform speed through drive rolls 30. A spring-mounted arm 31 acts as an input reservoir for strands to be intermittently fed through input tensioning and gripping rolls 32. An intermittent drive, comprising constant speed roll 33 and gripping roll 34 engageable with the constant speed roll 33, takes the strands past an output spring-mounted arm 35, acting as an output reservoir for the combined yarn, and to constant speed rolls 36 which deliver the yarn to a take-up package or to further machinery. The input and output reservoirs should contain as much yarn as is needed for one cycle of the apparatus therebetween. Between the tensioning and gripping rolls 32 and gripping rolls 34 are twist belts 37 and 38 disposed above and below the yarns respectively. Adjacent the twist belts are guide fingers 39 and 40 (FIGS. 18 and 19) for moving the strands into contact with the twist belts. As shown in FIGS. 18 and 19, the guide fingers are F-shaped members which hold the strands and are movable perpendicularly to the twist belts to carry the strands to the belts (FIG. 19) and away from the belts (FIG. 18).

Figure 16:
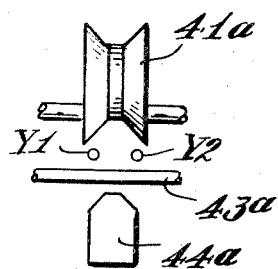
FIG. 16 is a section on line 16—16 of FIG. 15.
Figure 17:
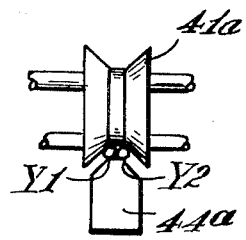
FIG. 17 is a view similar to FIG. 16 showing the apparatus of FIG. 16 in a different position.

Joining mechanisms A and B comprising eccentric V rolls 41a and 41b, guide rolls 42a, 43a and 42b, 43b, and joining means 44a and 44b, are disposed one adjacent the twist belts and one adjacent the input gripping rolls 32, i.e., in regions of twist reversal. As shown in FIGS. 16 and 17, the eccentric V roll is movable between a position permitting the strands to be freely twisted and moved (FIG. 16), and a position gathering the strands and urging them against joining means 44 (FIG. 17). The joining means 44 can be a cement or adhesive applicator for bonding the strands together; a heater for fusing the strands together; a mount for mechanical elements such as needles to cause fiber entanglement; a nozzle for a high speed air stream to cause fiber entanglement; or means for applying additional fibers to tie or entangle the strands. The intermittent drive, guide fingers, and joining mechanisms are operated in timed relationship to perform the processes as described.

It can be readily appreciated that the method of the invention enables the apparatus described above to handle a large number of parallel strands with the same twist belts, rollers, etc., thus enabling a sheet of twisted yarns, useful in some applications, to be produced and directly fed to multiple-yarn-utilizing machinery, or to many single-yarn-utilizing machines.

The above apparatus is for the purpose of illustrating one highly practical means for performing the method according to the invention. Other well known apparatus may be used; for example, twist may be applied by twist tubes with joining downstream of the tubes, or by an air stream. Other substitutions, as for the joining mechanism or feed means, will be apparent.

We claim:

1. The method of forming a combined yarn from a plurality of component strands, comprising applying an axial twist to at least one component strand, said twist alternating in directions in lengthwise intervals and said twist causing said at least one component to rotate in said intervals relative to at least one other component strand, characterized in that said at least one component is joined to said at least one other component in the regions of twist reversal, and in that an axial alternating twist is applied to said at least one other component strand prior to joining the said one component strand, and the twist applied to said component strands are in opposite rotational directions in the lengthwise regions between joining so that the components acquire counterbalancing torques.

2. A combined yarn formed of a plurality of component strands comprising a first at least one component strand having an axial twist, alternating in directions in lengthwise intervals, and a second at least one component having such axial alternating twist, the combined yarn having opposing torques in each interval to maintain said components in twisted condition, characterized in that said two components are substantially straight and parallel to one another, the individual torques of the component counterbalancing one another, and said second component is joined to the first in the regions of twist reversal.

3. The method of forming a combined yarn from a plurality of component strands, comprising applying an axial twist to at least one component strand, said twist alternating in directions in lengthwise intervals and said twist causing said at least one component to rotate in said intervals relative to at least one other component strand, joining said at least one component to said one at least one other component in the regions of twist reversal, said at least one component strand being twisted so that it acquires a torque not counterbalanced by torques of the remainder of the component strands, thereby causing the components to entwine by conversion of said axial twist into ply twist of the combined yarn, and, after joining, rotating said combined yarn in the direction of said entwining.

References Cited

UNITED STATES PATENTS

| | | | |
|---|---|---|---|
| 3,052,079 | 9/1962 | Henning | 57—34 |
| 3,116,588 | 1/1964 | Breen et al. | 57—140 XR |
| 3,177,642 | 4/1965 | Korikovsky | 57—34 |
| 3,225,533 | 12/1965 | Henshaw | 57—156 XR |
| 3,306,023 | 2/1967 | Henshaw et al. | 57—156 |
| 3,367,097 | 2/1968 | Menasoff | 57—34 |

DONALD E. WATKINS, *Primary Examiner.*

U.S. Cl. X.R.

57—156, 153, 164